March 22, 1966  B. BISSCHOPINCK  3,242,380
APPARATUS FOR PRODUCING A REPETITIVE CONTROL SEQUENCE
Filed March 3, 1960  2 Sheets-Sheet 1

INVENTOR
BERNARD BISSCHOPINCK

BY Browne, Schuyler, & Beveridge

ATTORNEYS.

March 22, 1966 B. BISSCHOPINCK 3,242,380
APPARATUS FOR PRODUCING A REPETITIVE CONTROL SEQUENCE
Filed March 3, 1960 2 Sheets-Sheet 2

Inventor:
BERNARD BISSCHOPINCK

BY Mead, Browne, Schuyler & Beveridge
ATTORNEYS

United States Patent Office

3,242,380
Patented Mar. 22, 1966

3,242,380
APPARATUS FOR PRODUCING A REPETITIVE
CONTROL SEQUENCE
Bernard Bisschopinck, Rehlberg, Germany, assignor to Kloeckner-Werke AG, Duisburg, Germany, a corporation of Germany
Filed Mar. 3, 1960, Ser. No. 12,521
Claims priority, application Germany, Mar. 3, 1959, K 37,137; Sept. 26, 1959, K 38,783
14 Claims. (Cl. 315—139)

This invention relates generally to control apparatus and, more particularly, to apparatus useful for actuating switch members, shears and hoists in rolling mills and foundries and wherein the apparatus is capable of actuating such devices so as to reproduce, or copy, a desired sequence of operations to be performed.

It is well known to provide mechanical devices which are capable of repetitively actuating switch members whereby complicated electrical switching operations may be carried out. One type of such a mechanical device comprises a number of suitably formed cam discs, templets, or the like, which are arranged successively along a shaft, and which include one or more cams which, from time to time, close or open an electrical contact system according to the angle of rotation of the shaft. The cams of the particular discs or templets are arranged in relation to each other according to the required cycle of switching operations, and the period of time during which the switches are operated, or are not operated, is governed by the cam shape.

These known mechanical devices require a large amount of space, which, in the frequent crowding prevalent in rolling mills and foundries, often places the mechanisms in relatively inaccessible positions. Moreover, such mechanical devices are very much subject to repair and whether the devices are located in the open or in large rooms, they are extensively subjected to the influence of their environmental conditions.

It is an object of the present invention to provide an electrical control apparatus which overcomes the disadvantages mentioned above with respect to known mechanical apparatus.

It is another object of the present invention to provide such an electrical control apparatus which is extremely versatile in its operation for the amount of equipment involved.

In accordance with one feature of the invention, in place of the mechanical cam controlled contact system, the contact path of the aforementioned cam system is determined by means of the phase difference of two alternating current voltages, which controls the closing or opening of the cut-off cycle of an electronically regulated device. The phase relationship of these two alternating voltages may be changed with respect to each other so as to control the interval of opening or closing of the cut-off cycle of the electronically regulated device and serve as a measure for the contact path length of the cam mechanisms. Preferably, grid controlled gas discharge tubes are used as the electronically regulated devices.

In certain cases, an inductive or capacitive component of the anode resistances can exert an adverse reaction on one or more of the electronically regulated devices. This reaction can shift the voltage cut-off, in its respective position to the desired ignition point, in such a way that no further priming can occur. This disadvantage naturally should be avoided and the anode resistance can be bridged with a sufficiently small resistance which, however, is undesirable on the basis of the moderate power supply. Therefore, another feature of this invention includes a switching device which avoids the adverse reaction of the anode resistance on the operation of the device. In accordance with this other feature of the invention, between one or more of the electronically regulated devices and the individual anode resistances respectively, a rectifier is inserted in the current path of the anode resistance and is bridged by means of a preferably high, pure resistance expressed in ohms.

If two electronically regulated devices are employed, the same must be put into the circuit in opposite half cycles (anti-parallel) whereby both rectifiers associated with the respective tubes are put into the circuit in a direction of the anode current and also lie anti-parallel to each other.

The foregoing and other objects, advantages and features of this invention will become more apparent to those skilled in the art upon reference to the following specification and drawings, in which.

Figure 1:
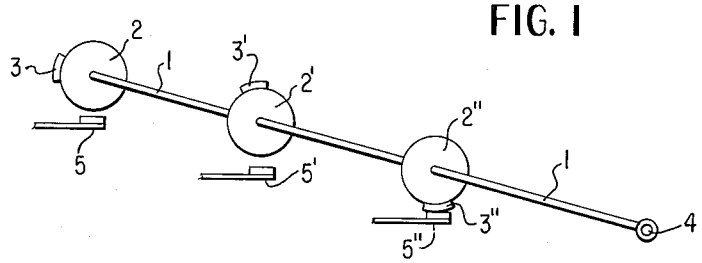
FIG. 1 shows a prior art mechanical control apparatus employing cam operated switches.

In order to obtain a full understanding of the nature of the present invention, reference is first made to FIG. 1 which discloses a prior art mechanism, which may be referred to as a copying mechanism. As seen in FIG. 1, cam discs 2, 2' and 2" are provided on a spindle or shaft 1. On the cam discs are cams 3, 3' and 3". The end 4 of the spindle is coupled to a suitable driving source (not shown) which may, for example, be associated with a rolling mill. During the rotation of shaft 1, the cams 3, 3' and 3", according to their angular displacement about the shaft 1, control the actuation of contacts 5, 5' and 5". In the illustrated embodiment of said prior art device, a contact occurs between the cam 3" and the contact 5" whereby a certain electrical control circuit is rendered operative or inoperative as the case may be. For the sake of abridgement, the electrical leads are not shown. However, it is clear from FIG. 1 that the characteristic size of the copying mechanism is determined by means of the length of the contact path of the cams and the angular displacement of the particular cams with respect to each other.

Figure 2:
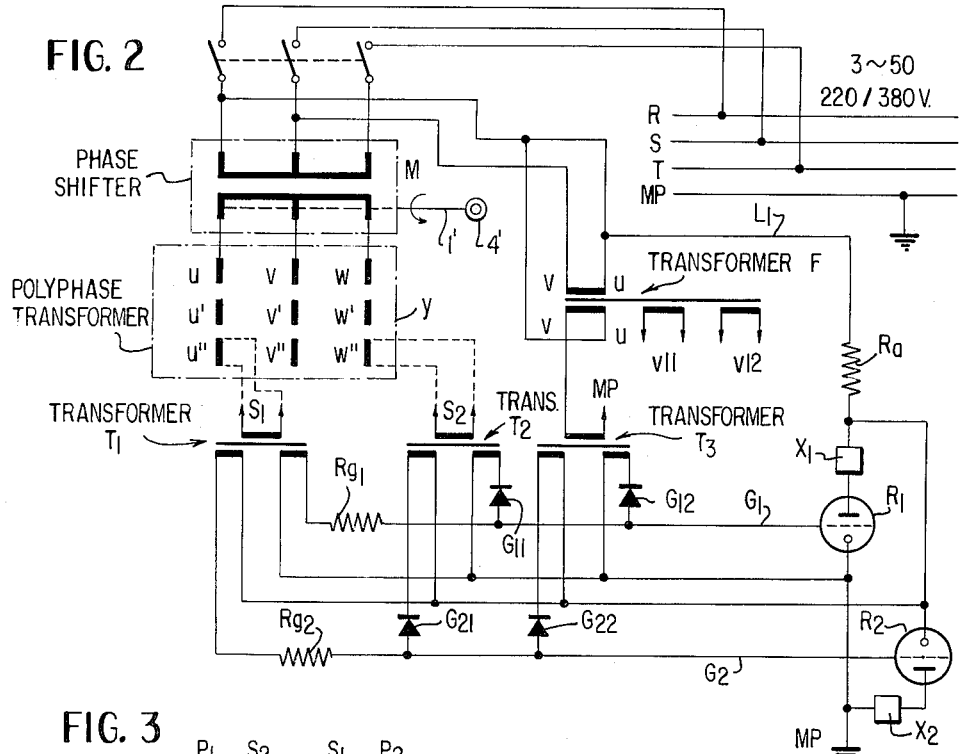
FIG. 2 is a circuit schematic of the electric control apparatus according to the present invention.

Referring now to FIG. 2, there is shown an arrangement according to the present invention which avoids the disadvantage of the mechanical copying system described hereinabove, through a simple, space-saving and almost disturbance-free electrical system which, moreover, can be located in a small, closed service room so that no destruction dangers can occur due to improper handling or other misfortunes.

A source of alternating current having phases R, S and T (FIG. 2) feeds power to a controller or regulator M, which may be a three-phase motor. If an ordinary three-phase, wound rotor induction motor is held so that its rotor will not rotate, the phase of the voltages induced in its rotor can be changed relative to the voltages of its stator by changing the positions of the rotor with respect to the stator. Such a device is known as a phase shifter. In the present invention, the rotor of such a device would not be held stationary but would be rotated in accordance with the rotation of spindle 1 shown in FIG. 1. The velocity of the regulator and spindle may be small in relation to the time period of the alternating current.

A schematically illustrated polygonal (polyphase) transformer Y is electrically connected to regulator M. Transformer Y has primary windings U. V and W and secondary windings U', V' and W', as well as U", V" and W". Alternating voltage of a desired phase position may therefore be taken from the secondary windings. Thus, any two alternating voltages may be taken from any of the windings U', V' and W', as well as U", V" and W", and these voltages may be displaced in phase with respect to each other.

A phase R of the three phase supply network is connected by means of lead $L_1$ to the anode of a grid controlled gas discharge tube $R_1$, while the ground wire MP is connected to the cathode of tube $R_1$. Obviously, any number of gas discharge tubes may be connected in this fashion. For the sake of completeness, only a second tube $R_2$ is shown, and this tube is connected in counter-cycle (or anti-parallel) to the tube $R_1$. The heating current for the tubes is taken from the transformer F at windings $V_{11}$ and $V_{12}$.

Anode resistance $R_a$ is inserted in the anode circuit of the tubes $R_1$ and $R_2$ so as to limit the current.

A pair of alternating current voltages illustrated as $S_1$ and $S_2$ are taken from the polygonal transformer Y and applied to the grid circuits $G_1$ and $G_2$ of gas discharge tubes $R_1$ and $R_2$, respectively. Preferably, these voltages are coupled from the polygonal transformer by means of transformers $T_1$ and $T_2$. In the following, only the grid circuit $G_1$ of the tube $R_1$ will be considered. It will be obvious, however, that this explanation will also apply to the grid circuit $G_2$ of tube $R_2$. It will be noted that, in the grid circuit $G_1$ of tube $R_1$, a resistance $R_g$ is inserted in the secondary circuit of transformer $T_1$ while a rectifier $G_{11}$ is inserted in the secondary of transformer $T_2$. The conduction or nonconduction of diode $G_{11}$, in conjunction with resistor $R_g$ and the voltage drop thereacross establishes the potential applied to the grid of tube $R_1$. This circuit arrangement assures that the ignition voltage is applied to the grid of tube $R_1$ only when voltages $S_1$ and $S_2$ are both positive. As noted earlier, the overlap area A is set by the amount of overlap in voltages $S_1$ and $S_2$ during positive half cycles.

Figure 3:
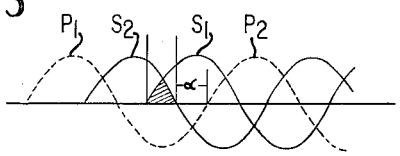
FIG. 3 is a voltage diagram which illustrates the phase relationship between voltages supplied to the grids of a gas discharge tube as well as the voltage supplied to the anode of said tube.

Referring now to FIG. 3, both grid voltages $S_1$ and $S_2$ are shown as overlapping each other with a phase overlap of, for example, 60°. As noted hereinabove, any phase position may be selected for the grid voltages $S_1$ and $S_2$. An ignition of the grid controlled gas discharge tube occurs only in the hatched areas A in which both voltages $S_1$ and $S_2$ have a positive value, provided the anode voltage is in a corresponding phase position, i.e., positive. The anode voltage in FIG. 3 is shown as a dotted line. In the illustrated phase relationships, no ignition of the grid controlled gas discharge tube can occur because in the area in which both the grid voltages $S_1$ and $S_2$ are positive, the anode voltage is in the negative portion of the cycle.

Now, if the spindle or shaft 1' of the regulator is shifted by a spindle drive source 4' about a mechanical angle α, both grid voltages $S_1$ and $S_2$ displace themselves about a corresponding angle, and after having completed the angle, the tube will ignite at the nadir of the positive half cycle of anode voltage of tube $R_1$. This voltage is indicated as $P_2$. By this means, the cam contact corresponding to the mechanical control apparatus described earlier hereinabove is established, and a switch means $X_1$ contained in the anode circuit of the grid control gas discharge tube $R_1$ is operated. On additional rotation of the regulator M, the grid voltages $S_1$ and $S_2$ advance past the positive half cycle of the anode voltage and conduction of the gas tube $R_1$ ceases.

Figure 4:
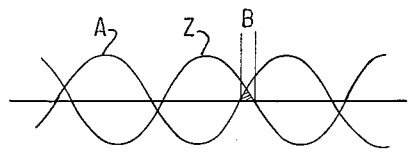
FIG. 4 illustrates a further voltage diagram and shows the phase relationship between the anode voltage and a further grid voltage.

In order to establish that the overlapping areas of both grid voltages is a measure for the angle corresponding to the angle of the cam mechanism, it must be guaranteed that in the further rotation of the regulator an ignition occurs only in this area. Without additional precaution, the corresponding angle width of the cams, will amount to about 180° plus the double length of the overlapped area, so that the conduction period or interval for tube $R_1$ will be relatively long. However, such a great conduction period or interval is undesirable in many cases. Therefore, a further voltage Z, shown in FIG. 4, is required, which is referred to hereinafter as the cut-off voltage. The voltage proceeds in synchronization with the anode voltage P and in relation to it is displaced an amount which comes to more than 180° so that a smaller area B is created in which both the anode voltage and the cut-off voltage have a positive value.

This cut-off voltage Z is coupled from transformer F to the grid circuit $G_1$ of tube $R_1$ by transformer $T_3$. A rectifier $G_{12}$ of suitable polarity is connected in circuit between the secondary of transformer $T_3$ and the grid circuit $G_1$ of the tube $R_1$. Thus, only in this narrow area (area B) in which these two voltages are positive can ignition of tube $R_1$ occur. The hatched area of the grid voltages $S_1$ and $S_2$, which corresponds to the cam length in a mechanical system, travels in consequence of the rotation of the regulator spindle 1' toward the right as shown in FIGS. 3 and 4, respectively, so that an ignition occurs only as long as the hatched area A lies in very small positive area B in which the anode of tube $R_1$ and the cut-off voltage are positive. An ignition of the grid controlled gas discharge tube takes place approximately for only a period in which the positive area A is guided over the small positive area B.

Consequently, a phase displacement between the grid voltages $S_1$ and $S_2$ is a satisfactory reproduction of the contact path of the customary mechanical cam system.

In order to utilize both the negative and positive half cycles of the alternating current, a second grid circuit $G_2$ can be provided which has corresponding circuit elements $R_g'$, $G_{21}$, $G_{22}$ and $R_2$.

Any number of pairs of phase displaced voltages may be taken from the polygonal transformer Y which are phase displaced with respect to voltages $S_1$ and $S_2$ an amount to correspond to the angular displacement of the cam system described above.

Figure 5:
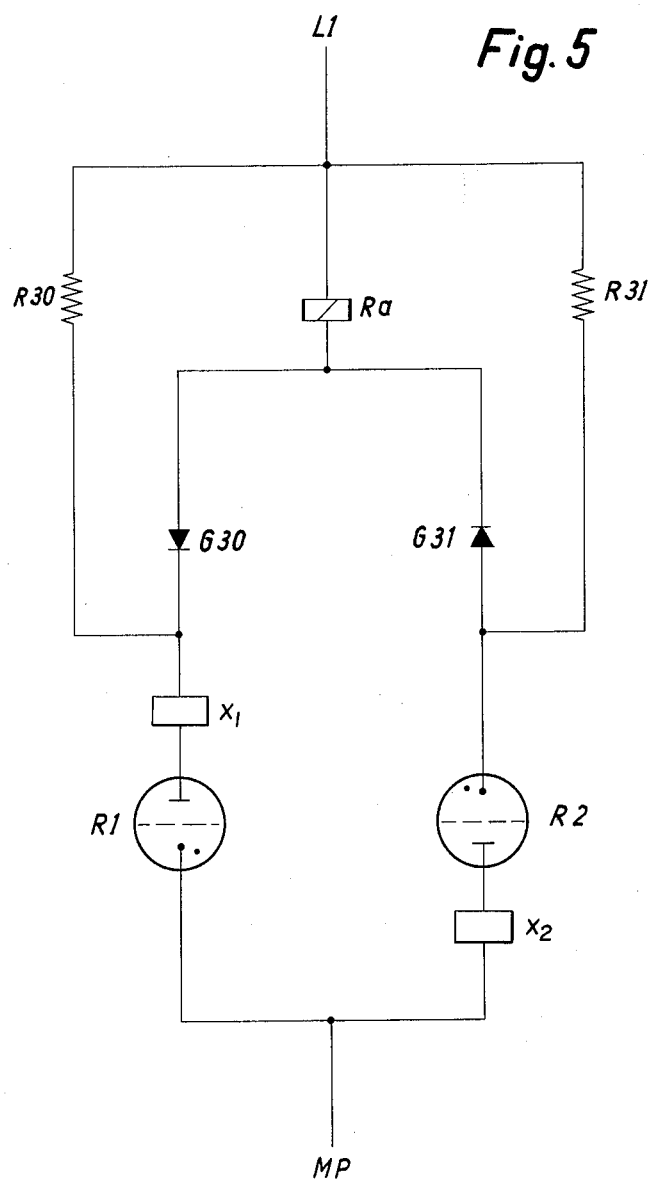
FIG. 5 shows a circuit schematic of another embodiment of the invention.

A modification of the invention as disclosed in FIG. 5, which modification is adapted to avoid the adverse effect of any capacitive or inductive reactance on the ignition point of tubes $R_1$ and $R_2$. The circuitry shown in FIG. 2 may be employed here and therefore there is no need to again describe the circuit operation.

In FIG. 5, both grid controlled gas discharge tubes are shown at $R_1$ and $R_2$, the current feed on the anode side is shown as $L_1$, and the anode resistance as $R_2$. To prevent an inductive or capacitive component of the anode resistance from reacting in an undesirable way on the anode or cathode sides, respectively, of tubes $R_1$ and $R_2$, the rectifiers $G_{30}$ and $G_{31}$ are inserted between the anode resistance $R_a$ and the tubes $R_1$ and $R_2$ which, from time to time, lie in the current paths of the tubes $R_1$ and $R_2$ as they conduct. The anode resistance $R_a$, as well as the rectifiers $G_{30}$ and $G_{31}$ are at times bridged by the high resistances $R_{30}$ and $R_{31}$, expressed in ohms, for dissipating the energy of the inductive or capacitive component of the anode impedance $R_a$. This guarantees that the tubes $R_1$ and $R_2$ always have the proper polarity voltage applied to their anodes so that in relation to the cut-off voltage, the ignition of tubes $R_1$ and $R_2$ occurs at the correct time.

The regulator M and the polygonal transformer Y can be used for all systems in common. Generally, a polygonal transformer has so many handling possibilities that sufficient voltages can be taken from it to reproduce a very complicated system of mechanical cam movements.

The cut-off voltage and the anode resistance can remain constant for all systems so that, with respect to these, many adjusting mechanisms are eliminated.

A modification of this system according to the invention may be necessary if the number of rotations of the spindle of the regulator M comes in a great series in which the motor frequency does not substantially deviate from the supply frequency. In this case, after the rotation of the rotor proceeds beyond the ignition point of the gas tubes, the positive overlapping areas of the grid voltages $S_1$ and $S_2$ are always enlarged or made smaller. These departures, however, can easily be corrected through a corresponding larger or smaller selected phase displacement of the voltages $S_1$ and $S_2$.

Essentially, for each regulating arrangement in consequence of the coupling with this arrangement, the speed of rotation is advanced allowing in general an easy correction. Of course, the grid control gas discharge tubes can be substituted by other ignition elements. For example, each gas discharge tube can be replaced by a corresponding key-lever system, such as a suitable multivibrator switch.

These and other modifications of the present invention will be apparent to those skilled in the art and it is intended that the scope of the present invention be limited solely by the appended claims.

I claim:
1. Apparatus useful for actuating switch members to produce a repetitive control sequence, said apparatus comprising means electrically connected to a source of alternating current voltage, said means including means for producing, when connected to said source, a pair of alternating current voltages displaced in phase with respect to each other by an amount corresponding to a desired interval and for steadily shifting the phase positions of said pair of alternating current voltages with respect to the voltage from said source and at a selected rate, an electrical control device, and means electrically connecting said control device to said voltage producing and shifting means and said source, said control device being responsive to said alternating current voltages to initiate a control signal only when the positive cycles of all of said alternating current voltages are at least partly in phase.

2. An apparatus according to claim 1 wherein said voltage producing and shifting means comprises a variable phase shifter, and a polygonal transformer connected to said variable phase shifter.

3. An apparatus according to claim 2, wherein said variable phase shifter comprises a polyphase alternating current motor having a rotor which is angularly adjusted in acordance with said selected rate of phase shift of said pair of phase displaced alternating current voltages with respect to the source of A.C. voltage.

4. An apparatus according to claim 3, wherein said electrical control device is a grid controlled gas discharge tube, said apparatus includes means to connect the anode of said tube to said source of alternating current voltage, and said means electrically connecting said control device to said voltage producing and shifting means extends between said last named means and the control grid of said tube.

5. An apparatus according to claim 4, including means for producing a cut-off voltage displaced in phase with respect to the voltage applied to the anode of said tube approximately 180°, and means electrically connecting said cut-off voltage producing means to the control grid of said tube.

6. An apparatus according to claim 5, including an electrical resistance connected electrically in the control grid circuit of said tube.

7. An apparatus according to claim 4, including an electrical resistance connected in series with the control grid of said tube.

8. An apparatus according to claim 4, including a second grid controlled gas discharge tube, means electrically connecting the anode of said second tube to the cathode of said first tube, means electrically connecting the anode of said first tube to the cathode of said second tube, and means electrically connecting said voltage producing and shifting means to the control grid of said second tube.

9. An apparatus according to claim 8, including a rectifier electrically connected in the anode-cathode current path of each of said respective tubes, each rectifier being connected in a forward conducting direction with respect to the anode-cathode circuit with which said rectifier is associated, a resistance electrically connected in common with both anode-cathode circuits of said tubes, and a second resistance electrically connected in bridging relation to each of said rectifiers and said common resistance to eliminate shifting of the ignition point of either tube because of inductive or capacitive reactance in the respective tube circuits.

10. Apparatus useful for producing a repetitive control sequence comprising an electrical induction device having a relatively fixed member forming a primary circuit and a rotatable member forming a secondary circuit, means for connecting the primary circuit to a source of alternating current voltage, means for rotating the rotatable member in accordance with a desired control rate, said secondary circuit being operable, when said rotatable member is rotated, to develop voltages in said secondary circuit which are shifted in phase relative to the phase of said source and at a rate proportional to said desired control rate, a phase controlled switch having at least one control element, means electrically connecting said phase controlled switch to the source of alternating current voltage, and means electrically connecting said secondary circuit to said control element to apply said secondary voltages to said control element to change the condition of said phase controlled switch as a function of said desired control rate.

11. Apparatus as defined in claim 10 including means connected to said secondary circuit for developing a plurality of pairs of secondary alternating current voltages, each alternating current voltage of a pair being displaced in phase a constant displacement with respect to the other voltage of the pair, and at least one of said pairs being the alternating current voltages applied to said control element, and means for applying a further alternating current voltage to said control element having a constant phase displacement with respect to said source of alternating current voltage, said phase controlled switch being energized only when all of said alternating current voltages are at least partly in phase.

12. Apparatus as defined in claim 11 wherein said further alternating current voltage is displaced more than 180° in phase with respect to said source of alternating current voltage and forms a cut-off voltage for said phase controlled switch.

13. Apparatus as defined in claim 12 wherein said means electrically applying said pair of secondary alternating current voltages to said control element comprises an isolation transformer for each voltage of a pair of secondary voltages, a rectifier associated with one of said isolation transformers, and an ohmic resistance associated with the other of said isolation transformers, and wherein said phase controlled switch comprises a grid controlled gas discharge tube with the grid thereof forming said control element, and means for applying said pair of alternating current voltages and said cut-off voltage in parallel to the grid of said grid control discharge tube.

14. Apparatus as defined in claim 10 including means connected to said secondary circuit for developing a plurality of pairs of secondary alternating current voltages, each alternating current voltage of a pair being displaced in phase a constant displacement with respect to the other voltage of a pair, a plurality of pairs of phase controlled switches, the number of said pairs of secondary alternating current voltages, each phase controlled switch comprising a grid controlled gas discharge tube in which the grid thereof forms said control element, means connecting each such pair of tubes back to back in parallel so that the anode of one is connected to the cathode of the other, corresponding pairs of isolation transformers for each of said pairs of alternating current voltages, a rectifier in the circuit of one of the transformers of each of the pairs of isolation transformers, respectively, and an ohmic resistance in the circuit of the other isolation transformer of a pair, respectively, means for applying each such pair of voltages in parallel and to the grid of one of said tubes.

References Cited by the Examiner

UNITED STATES PATENTS

| | | | |
|---|---|---|---|
| 1,960,217 | 5/1934 | Unger | 315—194 |
| 2,288,338 | 6/1942 | Willis | 315—195 X |
| 2,389,692 | 11/1945 | Sherwin | 328—150 |
| 2,426,054 | 8/1947 | Rose | 315—195 |

GEORGE N. WESTBY, *Primary Examiner.*

RALPH G. NILSON, ARTHUR GAUSS, *Examiners.*